Dec. 4, 1962 J. J. RAMGE 3,066,456
WORK MOVING MACHINE
Filed July 5, 1961 3 Sheets-Sheet 1

INVENTOR.
JOSEPH J. RAMGE
BY
OLSEN AND STEPHENSON
ATTORNEYS

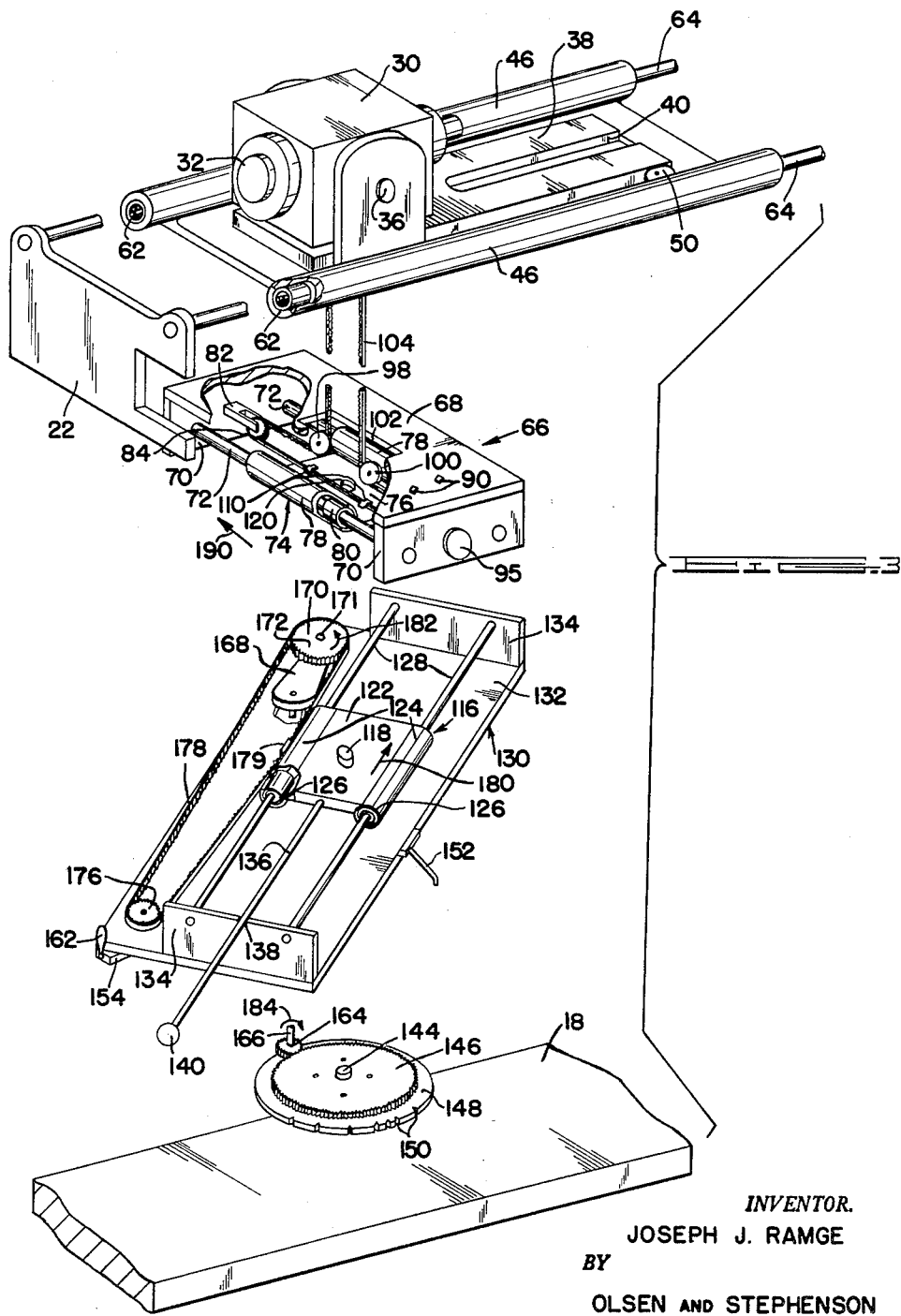

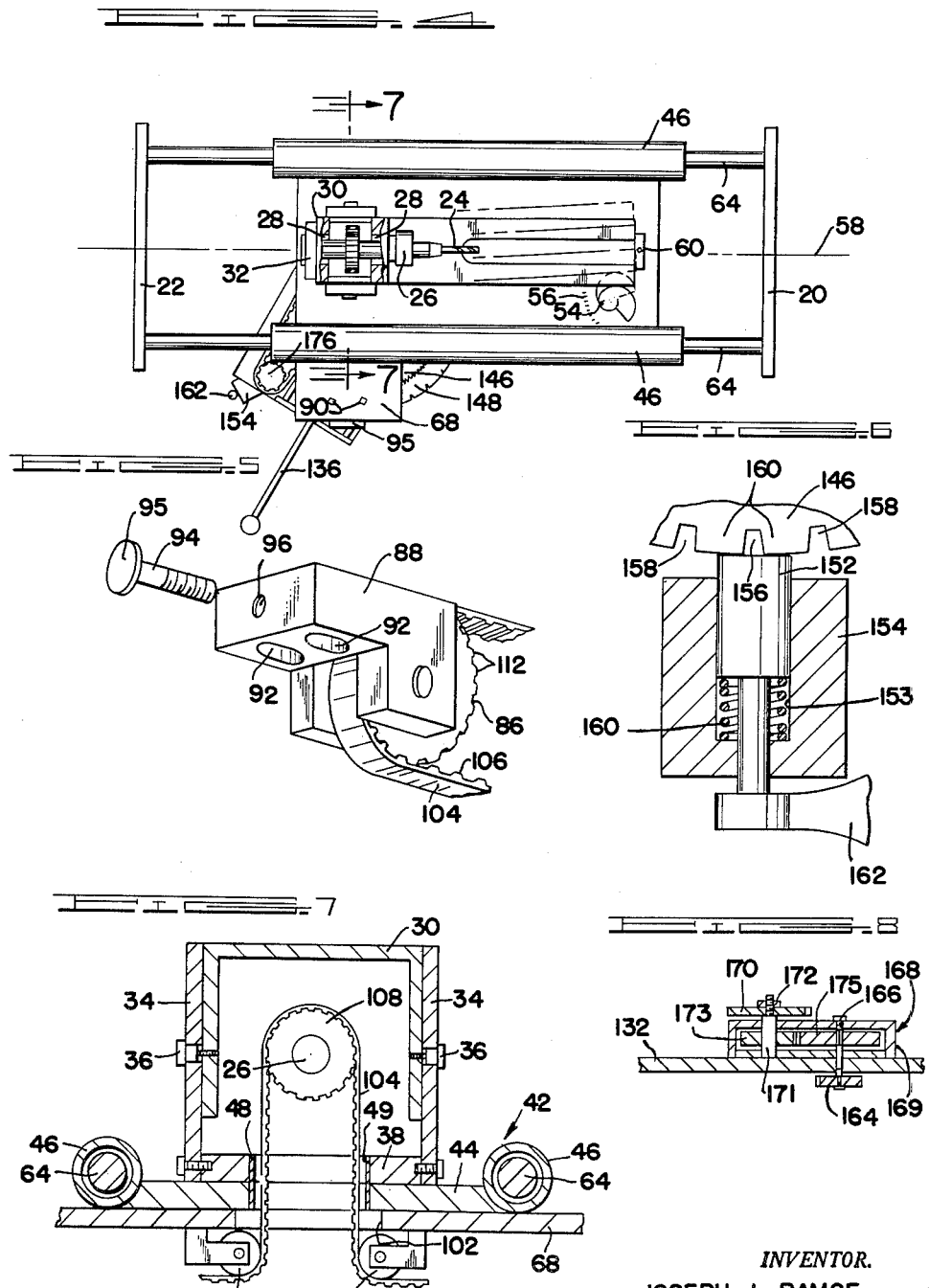

United States Patent Office 3,066,456
Patented Dec. 4, 1962

3,066,456
WORK MOVING MACHINE
Joseph J. Ramge, 1495 Fairholme Road,
Grosse Pointe Woods, Mich.
Filed July 5, 1961, Ser. No. 121,918
18 Claims. (Cl. 51—219)

This invention relates generally to metal working machines and more particularly to an improved machine of this type for use in tool forming, grinding, polishing, refluting and similar operations in which the work must be accurately moved along a predetermined path relative to a cutter, grinding wheel, polishing wheel or the like.

The forming, grinding, polishing, or refluting of work, such as end mills, drills, cams, worms and the like, requires a precision movement of the work relative to the metal removing tool which may be a cutter, a grinding wheel, a polishing wheel, or the like. In the past, work of this type, and particularly grinding, polishing, and refluting work in which the metal removing tool must follow established paths, has required the services of skilled machinists who operate a work moving machine and by visually observing the work and the metal removing tool manually manipulate the machine so that the work follows approximately the desired path. Such an operation is time consuming, costly, and subject to inaccuracies. Prior machines for automatically accomplishing complex movements of the work have utilized gears and racks which introduce backlash into the operation with a consequent lost motion which affects the accuracy of the operation. Such machines have generally been unacceptable for the additional reasons that the gears and racks wear, thereby adversely affecting the accuracy of the machine, the friction inherent in such machines increases operator fatigue and increases the power requirements when the machine is automated, and such machines have lacked the adjustments necessary to adapt them to the wide range of tools currently in use.

It is an object of this invention, therefore, to provide an improved machine of the above type which is adaptable to a wide range of work, requires no gears or racks for most operations, involves a minimum of frictional forces, and has defined settings which makes it possible to flute a given workpiece on the machine at a given setting and subsequently accurately grind, polish, resharpen, regrind and/or reflute the work at the same setting to thereby minimize the work involved in these subsequent operations with assurance that such operations are being carried out accurately.

A further object of this invention is to provide a machine of this type which is capable of forming helix angles on work at substantially any angle between zero and infinity and is capable of automatically varying the lead between defined limits when desired, such as when forming, grinding or polishing tapered workpieces, for example, tapered end mills.

Another object of this invention is to provide a machine of the above type in which the work supporting structure is adjustable about different axes to adapt the machine for work in which a plurality of such adjustments are required.

Another object of this invention is to provide a machine of the above type in which long fragile workpieces can readily be provided with a steady rest to provide auxiliary support for the workpieces during forming, grinding and polishing operations.

A further object of this invention is to provide a machine of the above type in which the usual back taper required in end mills and the like can readily be provided during operation of the machine to form, grind or polish work of this type.

A further object of this invention is to provide a machine of the above type in which the forces for moving the work so that it is concurrently rotated and advanced are transmitted from a movable member to the work support by a positive flexible drive which permits adjustment of the work support relative to the movable member without affecting the transmission of forces and without introducing backlash or other inaccuracies.

Still a further object of this invention is to provide a machine of the above type which utilizes a plurality of slide units in order to achieve the desired complex movement of the work, and in which the slide units are mounted on bearings to thereby reduce the friction involved in moving the work.

Further objects, features and advantages of this invention will become apparent from a consideration of the following description, the appended claims, and the accompanying drawing in which:

FIGURE 3 is a fragmentary exploded perspective view of the machine of this invention, with some parts broken away and other parts shown in section for the purpose of clarity;

FIGURE 4 is a plan view of the machine of this invention;

FIGURE 5 is a perspective detail view of the adusting mechanism for one of the pulleys in the machine of this invention;

FIGURE 6 is a sectional detail view of the lower slide frame locking mechanism in the machine of this invention;

FIGURE 7 is a fragmentary sectional view looking substantially along the line 7—7 in FIG. 4; and FIGURE 8 is a fragmentary sectional view of a portion of the machine of this invention.

Figure 1:
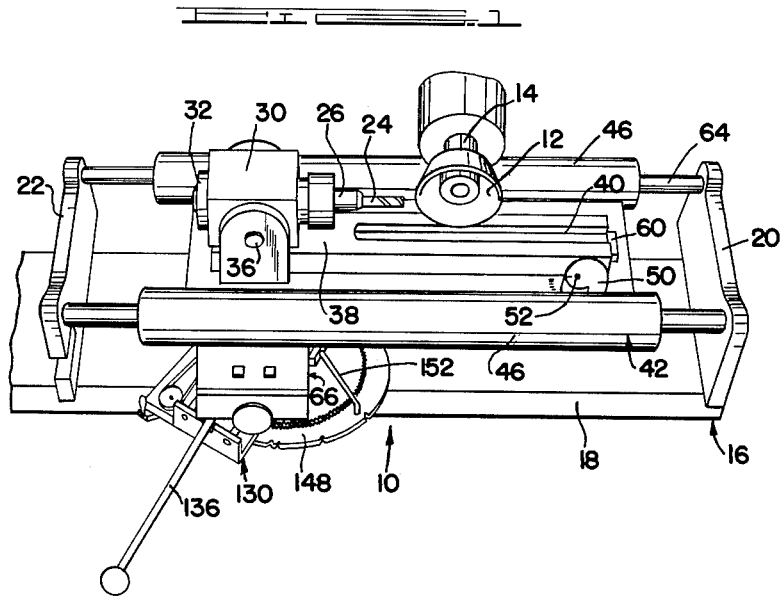
FIGURE 1 is a fragmentary perspective view of the machine of this invention, illustrated in a position adjacent an abrasive wheel to be used in a work operation with the machine.

With reference to the drawing, the machine of this invention, indicated generally at 10, is illustrated in FIG. 1, positioned adjacent an abrasive wheel 12 mounted on a rotatable spindle 14, although it is to be understood that a cutter or other metal removing tool may be used in place of the wheel 12 depending on the particular operation to be performed on the workpiece. The spindle 14 is mounted on any suitable machine (not shown) capable of rotating the spindle 14 and positioning the wheel 12 in a desired position relative to the machine 10.

The machine 10 includes a main frame 16 (FIG. 1), which consists of a horizontal bed plate 18 having a pair of horizontally spaced upstanding end plates 20 and 22, mounted on any suitable adjusting mechanism (not shown) which is capable of providing for vertical and horizontal movement of the frame 16 sufficient to position a workpiece in a desired location relative to the abrasive wheel 12. In FIGS. 1 and 4, the workpiece is illustrated as a straight end mill 24 and in FIG. 2 it is illustrated as a tapered end mill 24a for the purpose of illustrating an adjustment of the machine 10 which adapts it for tapered tools. The workpiece 24 or 24a is mounted in a conventional tool holder 26 which is rotatably supported on bearings 28 carried by a hollow body member 30. An index mechanism 32, the details of which form no part of the present invention, is mounted on the body member 30, on the side thereof opposite the tool 24 or 24a, for manual operation to index the tool to position different portions of the tool 24 in operative positions relative to the wheel 12.

The body member 30 is supported on and positioned between a pair of side plates 34 which carry a pair of axially aligned mounting bolts 36 (FIG. 7). When the bolts 36 are loosened, the body member 30 may be rotated about a horizontal axis extending through the axes of the bolts 36 to an adjusted position (FIGS. 1 and 2), and on tightening of the bolts 36, the body member is clamped between the side plates 34 in the adjusted position.

The side plates 34 are secured to opposite sides of an elongated support plate 38 which is formed on its top side with an elongated groove 40 to facilitate the mounting of auxiliary attachments, such as a steady rest (not shown) on the plate 38. The support plate 38 rests on an upper or main slide unit 42 which consists of a plate 44 secured to and extended between a pair of substantially parallel tubular members 46. An upright bushing 48 secured to the plate 44 telescopes into an opening 49 in the support plate 38 for pivotally mounting the support plate 38 on the plate 44 so that the support plate 38 can be adjusted about the vertical axis of the bushing 48. A cam 50 secured to the top side of the plate 44 by a pivot pin 52 engages one side of the support plate 38 and carries an index mark 54 which coacts with a plurality of index marks 56 on the top side of the plate 44 to indicate the angular position of the support plate 38. In other words, the cam 50 is rotatable about the axis of the bolt 52 with the plate 38 maintained in engagement with the adjacent side of the cam 50, and the position of the index mark 54 relative to the marks 56 indicates the angular position of the support plate 38 relative to a vertical plane 58 which includes the axis of the tool 24 or 24a and is substantially midway between the tubular members 46. A releasable clamping member 60 carried by the plate 44 is engageable with the end of the support plate 38 to maintain it in an adjusted position.

The tubular members 46 are provided at their ends with bearings 62, of ball bearing type, which are supported on guide rods 64 connected to and extended between the main frame end plates 20 and 22. The guide rods 64, which are substantially parallel, thus cooperate with the end plates 20 and 22 to form an upper slide frame which slidably supports the main slide unit 42 for back and forth movement in a substantially horizontal plane.

A middle slide frame 66, disposed below the slide unit 42, consists of a base plate 68 and a pair of depending end plates 70 disposed at opposite ends of the base plate 68 which is secured, as by welding or the like, to the underside of the main slide frame plate 44 so that the slide unit 42 and the slide frame 66, which is disposed below the body member 30 (FIG. 7), function as a unitary part. A pair of guide rods 72, which are substantially perpendicular to the guide rods 64, are secured to the end frame plates 70 so that they are substantially parallel and extend between the end plates 70. A middle slide unit 74, which consists of a plate 76 and a pair of tubular members 78 which are secured to the opposite sides of the plate 76 and carry at their ends ball bearing units 80, like the bearings 62, is slidably supported on the guide rods 72 so that it is slidable back and forth in a direction substantially perpendicular to the direction of movement of the upper slide unit 42.

One of the end plates 70 carries a bracket 82 which rotatably supports a pulley or sprocket 84. A second pulley or sprocket 86, positioned in the vertical plane of the pulley 84, is rotatably supported on a bracket 88 which is secured to the middle slide frame 66 by bolts 90 extended downwardly through the base plate 68. The bolts 90 extend through elongated slots 92 in the bracket 88 so that when the bolts are loosened the bracket 88 may be moved toward or away from the bracket 82 to adjust the distance between the pulleys 84 and 86. An adjustment bolt 94 having an enlarged head 95 extends through one of the end plates 70 into a threaded opening 96 in the bracket 88 so that on rotation of the bolt 94, the bracket 88 is moved toward or away from the adjacent end plate 70 to adjust the distance between the pulleys 84 and 86 for a purpose to appear presently. A pair of pulleys 98 and 100 are rotatably mounted on the base 68 of the frame 66 at positions in the vertical plane of the pulleys 86 and 84 and on opposite sides of an opening 102 formed in the base 68.

A power transmitting member 104, which may be any suitable positive flexible drive member such as a nonelastic belt, chain or the like, and which is illustrated as being a belt having teeth or lugs 106 formed thereon, is trained about the pulleys 84, 86, 98, 100 and a pulley or sprocket 108 (FIG. 7) which is secured to the work support 26 at a position within the body member 30. A portion of the belt 104 is secured, as by clips or brackets 110, to the middle slide unit 74. All of the pulleys 84, 86 and 108 may be smooth cylindrical members but are preferably of the type illustrated in FIG. 5 having teeth 112 which are spaced so that the lugs 106 on the belt 104 will fit between the teeth 112. The belt 104 is preferably of the type having steel wires or cables running therethrough so that it will not stretch and is trained about the pulleys so that a positive drive, without any slipping, of the sprocket 108 is obtained in response to movement of the drive member 104. As used herein, the term "belt and pulley assembly" is inclusive of any positive flexible drive assembly utilizing pulleys, sprockets, sheaves, chains, belts and the like. By virtue of the connection of the belt and pulley assembly to the middle slide unit 74 and the work holder 26, slidable movement of the middle slide unit 74 on its guide rods 72 effects rotatable movement of the work holder 26 with a consequent rotation of the tool 24 or 24a.

Positioned below the middle slide unit 74 is a lower slide unit 116 which carries a pivot pin 118 positioned in an opening 120 in the middle slide unit 74 so as to pivotally connect the slide units 74 and 116. The lower slide unit 116 consists of a base plate 122 which is secured at its opposite sides to a pair of substantially parallel tubular members 124 which carry, at their ends, bearings 126, like the bearings 62, which are slidably supported on a pair of substantially parallel guide rods 128. A lower slide frame 130, consisting of a base plate 132 having end plates 134, supports the guide rods 128 which are secured at their ends to the end plates 134. An actuating rod 136, secured to the lower slide frame 116 extends through a guide notch 138 in one of the end plates 134 and is provided at its terminal end with a knob 140 which is manually grasped to slide the frame 116 back and forth on the guide rods 128.

The base plate 132 in the lower frame 130 is pivotally supported on a pivot pin 144 carried by a spur gear 146 which is secured to an index plate 148 which is in turn secured to the main frame bed plate 18. The index plate 148 is provided with index notches 150 and a pointer member 152 is secured to one side of the lower frame 130 so that as the frame is pivoted about the pivot pin 144, the pointer member 152 swings in an arc adjacent the notches 150. The index notches 150 represent specific leads used on spiral tools and for a given position of the pointer 152 opposite a notch 150 a specific lead is obtained on the workpiece.

For locking the lower frame 130 in a desired position relative to the index plate 148, a locking plunger 152 (FIG. 6) is slidably mounted in a cavity 153 in a housing 154 secured to the base plate 132 so that as the frame 130 is rotated about the pivot pin 144, the housing 154 swings in an arc adjacent the periphery of the spur gear 146. A projection 156 on the plunger 152 is of a shape such that in one position of the plunger 152, the projection 156 will fit in a notch 158 between adjacent teeth 160 on the spur gear 146. When the plunger 152 has been retracted into the cavity 153 so as to withdraw the projection 156 from a notch 158, the plunger 152 may be rotated 90°, by manipulation of a handle 162 secured to the plunger 152, so as to position the projection 156 so that it will span the distance between a pair of adjacent teeth 160 to prevent its insertion into a notch 158. A spring 164 in the housing 154 urges the plunger 152 toward the spur gear 146.

A pinion gear 164 (FIGS. 3 and 8) positioned in meshing engagement with the spur gear 146 is supported on an upwardly extending shaft 166 carried by a gear reduction unit 168 mounted on the lower slide frame 130. The unit 168 includes a housing 169 and a second shaft 171. A gear 173 secured to the shaft 171 drives a gear 175 secured to the shaft 166. A sprocket 170 is releasably attached by a nut 172 to the shaft 171. Consequently when the nut 172 is tightened, rotation of the sprocket 170 effects rotation of the gears 173 and 175 in the gear reduction unit 168 to rotate the pinion gear 164 about the periphery of the spur gear 146.

An idler sprocket 176, mounted on the lower slide frame 130 in the plane of the sprocket 170 has a belt 178, like the belt 104, trained thereabout and about the sprocket 170 as shown in FIG. 3. The belt 178 is secured by a bracket 179 to one of the tubular members 124 in the lower slide unit 116. As a result, when the nut 172 is tightened to secure the sprocket 170 to the shaft 171, reciprocal movement of the lower slide unit 116 results in rotation of the sprocket 170 which in turn causes rotation of the pinion gear 164 about the spur gear 146. This movement of the pinion gear 164 effects a rotation of the lower slide frame 130 about the pivot member 144 to thus vary the angular position of the lower slide unit 116 relative to the middle slide unit 74. The effect of this variation is to vary the extent of rotation of the workpiece 24 or 24a for each increment of translatory movement thereof.

The gears 173 and 175 in the gear reduction unit 168 are arranged so that when the lower slide unit 116 is moved in the direction of the arrow 180 to effect a rotation of the sprocket 170 in the direction of the arrow 182, the pinion gear 164 is rotated in the direction of the arrow 184 to in turn rotate the lower slide frame 130 in a clockwise direction when viewed from above. As a result, as the lower slide frame 130 is rotated about the pivot member 144 in a clockwise direction when viewed from above, sliding movement of the slide frame 116 produces a progressively smaller component of this movement in a direction parallel to the guide rods 72 which is translated into rotation of the workpiece.

In the operation of the machine 10, the workpiece 24 or 24a is first mounted in the tool holder 26 and the metal removing tool, such as the cup shape abrasive wheel 12, is positioned in the desired position relative to the workpiece. Assume that the straight end mill 24 is to be reground. This requires a movement of the tool 24 so that each of its helical cutting edges is progressively advanced along its length into engagement with the end face of the grinding wheel 12 so that the wheel 12 will form the desired surface, with the appropriate clearance angle, on each cutting edge. Such a movement of the workpiece 24 relative to the rotating wheel 12 requires concurrent translatory movement of the workpiece 24 across the face of the wheel 12 and a predetermined rotation of the tool 24 for each increment of translatory movement of the tool.

The index notches 150 in the index plate 148 indicate specific leads. The locking mechanism for the lower slide frame 130 is released by withdrawing the plunger 152 into the cavity 153 so as to retract the projection 156 out of a space between a pair of teeth 160 on the spur gear 146 and the lower slide frame 130 is rotated about the pivot member 144 until the pointer 152 is opposite the notch 150 in the index plate 148 corresponding to the lead on the straight or spiral fluted workpiece 24 or 24a which is to be worked in the machine 10. The handle 162 is then manipulated to position the locking projection 156 between a pair of teeth 160 on the spur gear 146 so as to lock the lower slide frame 130 in this position. Since the workpiece 24 is straight rather than tapered, a constant angle of movement of the slide unit 116 relative to the guide rods 64 is desired, so the nut 172 is loosened so that the sprocket 170 will merely idle on the shaft 171.

The tool 12 is positioned so that the outer end of one of the cutting edges on the end mill 24 is positioned against the wheel 12. The handle 140 on the actuating rod 136 is then manipulated so as to move the lower slide unit 116 in a direction opposite to the direction of the arrow 180 so as to move the tool 24 a slight distance away from the wheel 12. Rotation of the wheel 12 is commenced and the handle 140 is manipulated so as to move the lower slide unit 116 in the direction of the arrow 180 to move the cutting edge of the tool 24 which is to be reground across the end face of the rotating wheel 12. As the slide frame 116 is moved in the direction of the arrow 180, the lower slide frame 116 is moved at an oblique angle with respect to both the guide rods 72 and the guide rods 64 which are perpendicular to the guide rods 72. The component of the movement of the lower slide unit 116 in a direction parallel to the guide rods 72 results in movement of the middle slide unit 74 on the guide rods 72 in the direction of the arrow 190 (FIG. 3). By virtue of the connection of the middle slide unit 74 with the work holder 26, by means of the belt 104 and the pulley 108, this sliding movement of the middle slide frame 74 effects a rotation of the tool holder 26 and consequently a rotation of the workpiece 24 in a clockwise direction when viewed from the supported end thereof.

Concurrently with the sliding movement of the middle slide unit 74 on the rods 72, in response to movement of the lower slide unit 116, the middle slide unit 74 and the upper slide unit 42 are being moved from left to right as viewed in FIGS. 1 and 3 by the component of the movement of the lower slide unit 116 in a direction parallel to the guide rods 64. This movement of the upper slide unit 42 effects a translatory movement of the workpiece 24 in a direction to advance the cutting edge which is being reground across the face of the wheel 12.

It can thus be seen that the lower slide frame 130 can be set on the machine 10 to provide for a precision movement of the workpiece 24 in which it is concurrently advanced and rotated a predetermined amount relative to each increment of advance to effect a precise following movement of the helical cutting edges on the workpiece 24 on the surface of the abrasive wheel 12. As soon as one cutting edge on the tool 24 has been reground the index mechanism 32 is manipulated to position another cutting edge on the workpiece 24 in the precise position relative to the wheel 12 originally occupied by the first cutting edge which was reground. In the event back taper is to be formed on the cutting edge, the support plate 38 is adjusted, by manipulation of the cam 50 so that as the workpiece 24 is advanced toward the wheel 12, it moves progressively closer to the face of the wheel 12. This provides for a progressive decrease in the diameter of the workpiece 24 from its unsupported end so as to provide the desired back taper. The support plate 38 is locked in an adjusted position by manipulation of the locking member 60.

In all operations, the handle 95 on the bolt 94 is manipulated to move the bracket 88 so as to provide the desired tension in the belt 104 and remove any slack in the belt 104 and prevent the occurrence of any slippage or backlash.

Figure 2:
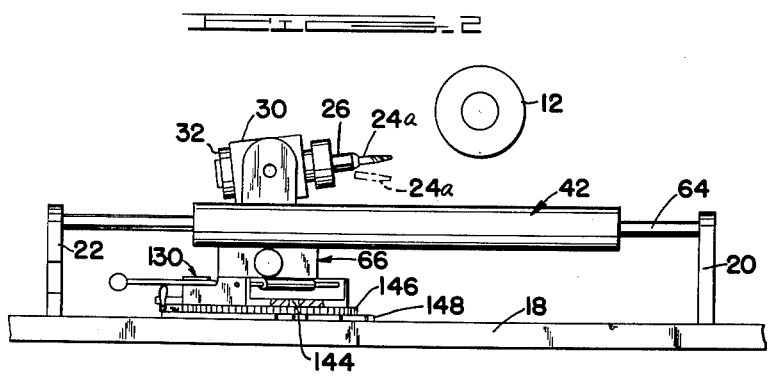
FIGURE 2 is a front elevational view of the assembly shown in FIG. 1, showing a different abrasive wheel in a moved position for work on a particular piece of work.

In the event the workpiece is a tapered end mill, which is to be "gashed," namely, have spiral flutes formed therein by a grinding wheel, such as illustrated at 24a in FIG. 2, a circular cutting wheel 12 is positioned so that the lower edge of the wheel is utilized for grinding. The locking bolts 36 are loosened and the body member 30 is inclined so that the top side of the tapered portion of the end mill 24a is substantially horizontal and at the level of the lower side of the wheel 12. The locking bolts 36 are then tightened to maintain the body member 30 in this position. In forming the cutting edges on a tapered tool, the lead of the cutting edges must be constantly varied in order to provide a cutting edge having the desired constant helix angle which provides the most efficient shear angle when in use. In other words, as the diameter of the tool increases the extent of rotation of the tool for each increment of advance must be decreased in order to provide the desired constant helix angle. Therefore, in grinding the cutting edges on the tool 24a, the position of the lower slide frame 130 with respect to the middle and upper slide units 74 and 42 must be constantly varied.

The initial position of the lower slide frame 130 is adjusted by rotating the slide frame 130 about the pivot member 144 to a position in which the pointer 152 is opposite the index notch 150 corresponding to the desired lead at the outer or small end of the workpiece 24a. A sprocket 170 is then selected which will provide for a rotation of the lower slide frame 130 to a position in which the pointer 152 will indicate the desired lead at the large end of the tapered portion of workpiece 24a when the large end is engaged with the lower side of cutting wheel 12. This sprocket is then clamped on the shaft 171 and the locking projection 156 is retained in a retracted position in which it will not move into a space between a pair of teeth 160 on the spur gear 146.

Starting with the slide frame 130 in a position in which the pointer 152 indicates the desired lead at the small end of the workpiece, the lower slide unit 116 is moved in the direction of the arrow 180, to both rotate the workpiece 24a and advance it relative to the wheel 12. As the slide unit 116 is moved, the pinion 164 is being moved about the spur gear 146 to progressively swing the lower slide frame member 130 in a clockwise direction as viewed from above to thereby progressively decrease the component of movement of the slide unit 116 in a direction parallel to the slide rods 72 to thereby progressively reduce the amount of rotation of the workpiece 24a for each increment of advance thereof.

Such a movement of the workpiece 24a relative to the cutting wheel 12 results in the formation of helical flutes in the workpiece having a constant helix angle. In grinding and polishing cutting edges on the fluted workpiece, a cup shape wheel 12 such as shown in FIG. 1 is utilized and the support plate 38 is adjusted about the bushing 48 to a position in which the side of the workpiece adjacent the face of the wheel 12 is substantially parallel to the guide rods 64. The bolts 36 are adjusted and the body member 30 is manipulated until the axis of the workpiece 24a is substantially horizontal. The grinding or polishing then proceeds, as in gashing, so that the workpiece is moved so that the cutting edges follow a path which brings them progressively into engagement with the wheel 12.

From the above description it is seen that this invention provides a machine 10 which is capable of providing a precision movement of workpieces of various shapes relative to a metal removing tool such as the grinding wheel 12. When a particular workpiece 24 or 24a is initially formed on the machine 10, by the use of suitable cutting, grinding and polishing wheels, such as the wheel 12, at a particular setting of the pointer 152, and with a particular diameter sprocket 170, when required, this information is readily stamped on the tool so that when it is reground, repolished and/or refluted on the machine 10, the machine 10 is readily set up to provide for a movement of the tool which corresponds exactly to its original movement in the machine. Consequently, subsequent operations of this type with the machine 10 can be quickly accomplished with assurance that it is being done in a precision manner.

Since all of the slide units 42, 74 and 116 are mounted on bearings which are rod-supported, the friction involved in moving the workpiece is reduced to a practical minimum so that wear of the machine is practically eliminated to thereby insure uniformity of operation of the machine 10 over a prolonged service life. The use of the belt and pulley assembly consisting of the endless belt 104 and pulleys 82, 88, 98, 102 and 108, eliminates any backlash in the transmission of movement of the lower slide unit 116 to the tool 24 or 24a. Consequently, this possible element of inaccuracy is eliminated. Since there is no limit to the extent of adjustable movement of the lower slide frame 130 relative to the guide rods 64 and 72, leads of any angle from zero to infinity can be formed on tools in the machine 10. For example, the machine 10 is operable to work on leads which extend diametrically of the tool axis and those which extend parallel to the tool axis.

It will be understood that the work moving machine which is herein disclosed and described is presented for purposes of explanation and illustration and is not intended to indicate limits of the invention, the scope of which is defined by the following claims.

What is claimed is:

1. In a machine of the character described, a main frame, a main slide unit slidably supported on said main frame for back and forth movement in one direction, means for rotatably supporting a tool on said main slide unit, a middle slide unit slidably supported on said main slide unit for back and forth movement in a direction substantially perpendicular to said one direction, positive flexible drive means connecting said middle slide unit and said tool supporting means so that slidable movement of said middle slide unit effects rotation of said tool supporting means, a lower slide unit pivotally connected to said middle slide unit, and means slidably supporting said lower slide unit on said main frame for back and forth movement in a direction at an oblique angle with respect to said one direction so that slidable movement of said lower slide frame is effective to both slide said upper slide unit in said one direction and slide said middle slide unit in a direction substantially perpendicular to said one direction to rotate said tool supporting means.

2. In a machine of the character described, a main frame, a main slide unit slidably supported on said main frame for back and forth movement in one substantially horizontal direction, means for rotatably supporting a tool, means mounting said tool supporting means on said main slide unit for adjustable up and down pivotal movement, a middle slide unit slidably supported on said main slide unit for back and forth movement in a second substantially horizontal direction transversely of said one direction, belt means connecting said middle slide unit and said tool supporting means so that slidable movement of said middle slide unit effects rotation of said tool supporting means, a lower slide unit pivotally connected to said middle slide unit, and means slidably supporting said lower slide unit on said main frame for back and forth movement in a direction at an oblique angle with respect to said one and said second directions so that slidable movement of said lower slide frame is effective to both slide said upper slide unit in said one direction and slide said middle slide unit in a direction transversely of said one direction to rotate said tool supporting means.

3. In a machine of the character described, a main frame, a main slide unit slidably supported on said main frame for back and forth movement in one direction, a support plate pivotally supported on said main slide unit for adjustable pivotal movement in a plane substantially parallel to the plane in which said main slide unit is slidable, means for rotatably supporting a tool on said support plate, a middle slide unit slidably supported on said main slide unit for back and forth movement in a second direction transversely of said one direction, belt means connecting said middle slide unit and said tool supporting means so that slidable movement of said middle slide unit effects rotation of said tool supporting means, a lower slide unit pivotally connected to said middle slide unit, and means slidably supporting said lower slide unit on said main frame for back and forth movement in a direction at an oblique angle with respect to said one and said second directions so that slidable movement of said lower slide frame is effective to both slide said upper slide unit in said one direction and slide said middle slide unit in a direction transversely of said one direction to rotate said tool supporting means.

4. In a machine of the character described, a main frame, a first pair of substantially parallel spaced guide rods mounted on said frame in substantially horizontal positions, a main slide unit having a pair of spaced tubular portions slidably supported on said guide rods for back and forth movement in one direction, a support plate pivotally mounted on said main slide unit for adjustable pivotal movement about a substantially horizontal axis, a body member pivotally mounted on said support plate for movement about a substantially horizontal axis, a work holder rotatably supported on said body member, a second pair of substantially horizontal spaced guide rods mounted on said main slide unit in positions substantially perpendicular to said first pair of guide rods, a middle slide unit slidably supported on said second pair of guide rods, pulley and belt means operatively associated with said middle slide unit and said work holder so that slidable movement of said middle slide unit effects rotation of said work holder, and means connected to said middle slide unit for moving said slide unit so as to effect a concurrent sliding movement of said slide units on their respective guide rods predetermined relative distances to thereby concurrently effect predetermined relative amounts of translatory and rotational movement of said work holder.

5. In a machine of the character described, a main frame, a main slide unit slidably supported on said main frame for back and forth movement in one direction, a work holder rotatably supported on said main slide unit, a second slide unit slidably supported on said main slide unit for back and forth movement in a direction substantially perpendicular to said one direction, positive flexible drive means connecting said second slide unit and said work holder so that slidable movement of said second slide unit effects rotation of said work holder, and means connected to said second slide unit for moving said second slide unit so as to effect a concurrent sliding movement of said slide units predetermined relative distances to thereby concurrently effect predetermined relative amounts of translatory and rotational movement of said work holder.

6. In a machine of the character described, a main frame, a main slide unit slidably supported on said main frame for back and forth movement in one direction, a work holder rotatably supported on said main slide unit, a second slide unit slidably supported on said main slide unit for back and forth movement in a direction substantially perpendicular to said one direction, a sprocket secured to said work holder, sprocket means carried by said main slide unit, a power transmission member secured to said second slide unit and trained about said sprocket member and said sprocket means so that slidable movement of said second slide unit effects rotation of said work holder, and means connected to said second slide unit for moving said slide units so as to effect a concurrent sliding movement thereof predetermined relative distances to thereby concurrently effect predetermined relative amounts of translatory and rotational movement of said work holder.

7. In a machine of the character described, a main frame, a first pair of substantially parallel spaced guide rods mounted on said frame in substantially horizontal positions, a main slide unit having a pair of spaced tubular portions slidably supported on said guide rods for back and forth movement in one direction, a support plate pivotally mounted on said main slide unit for adjustable pivotal movement about a substantially horizontal axis, a body member pivotally mounted on said support plate for movement about a substantially horizontal axis, a work holder rotatably supported on said body member, a second pair of substantially horizontal spaced guide rods mounted on said main slide unit in positions substantially perpendicular to said first pair of guide rods, a middle slide unit slidably supported on said second pair of guide rods, pulley and belt means operatively associated with said middle slide unit and said work holder to that slidable movement of said middle slide unit effects rotation of said work holder, a lower frame pivotally mounted on said main frame at a position below said middle slide unit for pivotal movement between a plurality of locked positions which are at an oblique angle relative to said one direction, a lower slide unit slidably mounted on said lower frame for sliding movement in a direction at an oblique angle to said one direction, and means pivotally connecting said lower slide unit to said middle slide unit so that sliding movement of said lower slide unit effects a concurrent sliding movement of said upper and middle slide units on their respective guide rods predetermined relative distances to thereby concurrently effect predetermined relative amounts of translatory and rotational movement of said work holder.

8. In a machine of the character described, a main frame, a first pair of substantially parallel spaced guide rods mounted on said frame in substantially horizontal positions, a main slide unit having a pair of spaced tubular portions, bearing in said tubular portions slidably supported on said guide rods so that said main slide unit is slidable back and forth in one direction on said guide rods, a body member pivotally mounted on said support plate for movement about a substantially horizontal axis, a work holder rotatably supported on said body member, a second pair of substantially horizontal spaced guide rods mounted on said main slide unit in positions substantially perpendicular to said first pair of guide rods, a middle slide unit having a pair of spaced tubular portions, bearings in said tubular portions slidably supported on said second pair of guide rods, pulley and belt means operatively associated with said middle slide unit and said work holder so that slidable movement of said middle slide unit effects rotation of said work holder, and means including a lower slide unit adjustably mounted on said frame and connected to said middle slide unit for moving said middle slide unit so as to effect a concurrent sliding movement of said main and middle slide units on their respective guide rods predetermined relative distances to thereby concurrently effect predetermined relative amounts of translatory and rotational movement of said work holder.

9. In a machine of the character described, a main frame, an index plate mounted in a fixed position on said main frame, a lower frame pivotally mounted on said spur gear for rotation about the axis thereof, a lower slide unit slidably supported on said lower frame, gear means supported on said lower frame and positioned in meshing engagement with said spur gear, belt means operatively associated with said gear means and said slide unit so that slidable movement of said slide unit effects rotation of said gear means and said lower frame about said spur gear, a middle slide unit pivotally supported on the upper side of said lower slide unit, an upper slide unit slidably supported on said main frame for back and forth movement in one direction at a position above said middle slide unit, means on said upper slide unit for rotatably supporting a tool, means carried by said upper slide unit slidably supporting said middle slide unit for back and forth slidable movement in a direction substantially perpendicular to said one direction, belt means connecting said middle slide unit and said tool supporting means so that slidable movement of said middle slide unit effects rotation of said tool supporting means, and index means carried by said lower frame and positioned adjacent said index plate for cooperation therewith to indicate the angular position of said lower frame relative to said one direction, whereby movement of said lower slide unit at an oblique angle relative to said one direction effects both rotation of said tool supporting means and slidable movement of said upper slide unit and the relative amounts of such rotation and slidable movement are varied as said lower frame rotates about said spur gear.

10. In a machine of the character described for effecting a concurrent rotatable and translatory movement of a workpiece mounted thereon, a main frame, an index plate mounted in a fixed position on said main frame, a spur gear fixed to said main frame, a second frame pivotally mounted on said spur gear for rotation about the axis thereof, a slide unit slidably supported on said second frame, gear means mounted on said second frame and positioned in meshing engagement with said spur gear, a first sprocket mounted on said second frame and arranged in a driving relation with said gear means, an idler sprocket mounted on said second frame, and a power transmission member trained about said sprockets and connected to said slide unit so that slidable movement of said slide unit effects rotation of said gear means about said spur gear to in turn provide for rotatable movement of said second frame about the axis of said spur gear.

11. In a machine of the character described, a main frame, an upper slide unit slidably supported on said main frame for substantially horizontal back and forth movement in one direction, means on said upper slide unit for rotatably supporting a tool, an index plate mounted in a fixed position on said main frame, a spur gear fixed to said main frame, a lower frame pivotally mounted on said spur gear for rotation about the axis thereof, a lower slide unit slidably supported on said lower frame for substantially horizontal back and forth movement at an oblique angle relative to said one direction for effecting concurrent rotation and translatory movement of said tool supporting means, gear means supported on said lower frame and positioned in meshing engagement with said spur gear, and belt means operatively associated with said gear means and said lower slide unit so that slidable movement of said slide unit effects rotation of said gear means and said lower frame about said spur gear to continuously change the angle of movement of said lower slide frame relative to said one direction.

12. In a machine of the character described for effecting a concurrent rotatable and translatory movement of a workpiece thereon, a main frame, an index plate mounted on said main frame, a second frame pivotally mounted on said main frame at a position above said index plate, pointer means on said second frame movable in an arc adjacent said index plate on pivotal movement of said second frame, coacting means on said frames for releasably locking said second frame in a pivotally moved position, a slide unit slidably mounted on said second frame, a workpiece holder movably mounted on said main frame, means operatively associated with said slide unit and said workpiece holder providing for concurrent rotatable and translatory movement of said workholder in response to slidable movement of said slide unit in proportions dependent on the pivotally moved position of said second frame.

13. In a machine of the character described for effecting a concurrent rotatable and translatory movement of a workpiece thereon, a main frame, an index plate mounted on said main frame, a second frame pivotally mounted on said main frame at a position above said index plate, said second frame including a pair of substantially horizontal guide rods, pointer means on said second frame movable in an arc adjacent said index plate on pivotal movement of said second frame coacting means on said frames for releasably locking said second frame in a pivotally moved position, a slide unit having a pair of substantially parallel tubular portions slidably mounted on said guide rods, a workpiece holder movably mounted on said main frame, means operatively associated with said slide unit and said workpiece holder providing for concurrent rotatable and translatory movement of said workholder in response to slidable movement of said slide unit in proportions dependent on the pivotally moved position of said second frame.

14. In a machine of the character described for effecting a concurrent rotatable and translatory movement of a workpiece thereon, a main frame, an index plate mounted on said main frame, a second frame pivotally mounted on said frame at a position above said index plate, said second frame including a pair of substantially horizontal guide rods, pointer means on said second frame movable in an arc adjacent said index plate on pivotal movement of said second frame, a spur gear mounted in a fixed position on said index plate and having external teeth, a locking member mounted on said second frame for selective movement to a position in which it projects into the space between a pair of adjacent spur gear teeth for releasably locking said second frame in a pivotally moved position, a slide unit slidably mounted on said guide rods, a workpiece holder movably mounted on said main frame, means operatively associated with said slide unit and said workpiece holder providing for concurrent rotatable and translatory movement of said workholder in response to slidable movement of said slide unit in proportions dependent on the pivotally moved position of said second frame.

15. In a machine of the character described, a main frame, a first slide unit slidably mounted on said main frame for back and forth movement in one direction, a hollow body member mounted on said slide unit for adjustable pivotal movement about a pair of axes which are substantially perpendicular, a workpiece holder rotatably mounted on said body member, a second slide unit slidably mounted on said first slide unit for back and forth slidable movement in a direction substantially perpendicular to said one direction, a first sprocket member fixed on said workpiece holder and positioned in said hollow body member, second and third sprocket members supported on said first slide unit, and a power transmission member trained about said sprocket members and secured to said second slide unit so that slidable movement of said second slide unit effects rotation of said workpiece holder.

16. In a machine of the character described, a main frame, a first slide unit slidably mounted on said main frame for back and forth movement in one direction, a body member mounted on said slide unit for adjustable pivotal movement about a pair of axes which are substantially perpendicular, a workpiece holder rotatably mounted on said body member, a second slide unit slidably mounted on said first unit for back and forth slidable movement in a direction substantially perpendicular to said one direction, a first sprocket member fixed on said workpiece holder, second and third sprocket members supported on said first slide unit in a spaced substantially aligned relation, adjustable means supported by said first slide unit and engaged with one of said second and third sprocket members for moving said one of said sprocket members toward and away from the other, and a power transmission member trained about said sprocket members and secured to said second slide unit so that slidable movement of said second slide unit effects rotation of said workpiece holder.

17. In a machine of the character described, a main frame, a first slide unit slidably mounted on said main frame for substantially horizontal back and forth movement in one direction, a body member mounted on the top side of said slide unit for adjustable pivotal movement about a pair of axes which are substantially perpendicular, a workpiece holder rotatably mounted on said body member, a second slide unit positioned below and slidably mounted on said first slide unit for back and forth slidable movement in a direction substantially perpendicular to said one direction, a first sprocket member fixed on said workpiece holder, and a power transmission member trained about said sprocket member and secured to said second slide unit so that slidable movement of said second slide unit effects rotation of said workpiece holder.

18. In a machine of the character described, a main frame, a first pair of substantially horizontal parallel guide rods mounted on said main frame, a first slide unit slidably mounted on said guide rods for back and forth movement in one direction, a hollow body member mounted on the top side of said slide unit for adjustable pivotal movement about a pair of axes which are substantially perpendicular, a workpiece holder rotatably mounted on said body member, a second pair of substantially horizontal parallel guide rods mounted on said first slide unit at a position below said body member in a position substantially perpendicular to said first guide rods, a second slide unit slidably mounted on said second guide rods for back and forth slidable movement, a first sprocket member fixed on said workpiece holder and positioned in said hollow body member, and a power transmission member trained about said sprocket member and secured to said second slide unit so that slidable movement of said second slide unit effects rotation of said workpiece holder.

References Cited in the file of this patent

UNITED STATES PATENTS

| | | |
|---|---|---|
| 1,268,961 | Gorham | June 11, 1918 |
| 2,349,324 | Wiedmann | May 23, 1944 |
| 2,436,873 | Sneva | Mar. 2, 1948 |
| 2,556,073 | Dixon | June 5, 1951 |
| 2,585,986 | Andreasson | Feb. 19, 1952 |
| 2,720,731 | Staat | Oct. 18, 1955 |
| 2,725,690 | French | Dec. 6, 1955 |